UNITED STATES PATENT OFFICE.

HIRAM STAPLES, OF NASHUA, NEW HAMPSHIRE, ASSIGNOR TO HIMSELF AND ELBRIDGE M. DUDLEY, OF SAME PLACE.

IMPROVED COMPOSITION FOR PAVEMENTS, ROOFING, &c.

Specification forming part of Letters Patent No. 93,018, dated July 27, 1869.

*To all whom it may concern:*

Be it known that I, HIRAM STAPLES, of Nashua, in the county of Hillsborough and State of New Hampshire, have invented a new and useful Composition for Pavements, Roofing, &c.; and do hereby declare the same to be fully described in the following specification.

My said composition I compose of the following ingredients, and in the proportions herein given, although I do not confine it to these precise proportions, as they may be varied somewhat without materially affecting the result—that is to say: I take thirty pounds of bitumen, (or the hard residuum of coal-tar, after being boiled so as to evaporate its liquid constituents sufficient to cause the rest, when cool, to assume an indurated state,) and I heat the same so as to melt it, and I mix with it, so melted, thirty-two gallons of liquid coal-tar. Next, I mix together twenty-eight cubic feet of fine gravel, and fourteen cubic feet of wood sawdust. To the mixture of sawdust and gravel I add the mixture of bitumen and coal-tar, and stir the whole together. This completes the composition, which is then ready for use.

To use it, it is to be spread on a surface to the thickness required, after which I finish the pavement by rolling upon and into the composition a layer of fine sand or comminuted granite.

The reason why I combine the bitumen with the coal-tar, rather than use either alone with the gravel and sawdust, is, were I to employ the coal-tar without the bitumen, the composition would be too soft or yielding and adhesive—that is, it would readily melt, or be liable to melt, in warm weather, for the reason that the tar contains too much liquid matter. So the bitumen, if used without the tar, would render the composition too brittle. It would be easily crumbled; but a due admixture of the bitumen and the coal-tar will insure the requisite hardness, and enable the composition to remain hard during warm weather, or while exposed to the heat of the rays of the sun.

The reason why I employ sawdust of wood in the composition is, that it gives body to it, aids in binding the other constituents of it together, renders the composition almost inodorous, and, in case of melting or softening of it by heat, it holds to the tar, and prevents it from working up through the composition, so as to get into and work through the facing layer.

I do not claim the employment of either bitumen or coal-tar or gravel in the formation of a pavement. Nor do I claim the use of sawdust with clay, and the painting or covering the same, when spread on a surface with a mixture of hot tar, rosin, and sand, and afterward covering the layer with sand, such being to make a covering for a roof. Nor do I claim the mixing of pulverized slate with coal-tar or oil to make a paint. Nor do I claim the composition which is the subject of the patent No. 59,391, dated Nov. 6, 1866.

What I do claim as my invention is—

1. The employment of bitumen and coal-tar in or about in the proportions stated, with gravel, or its equivalent, and wood sawdust, in the formation of a composition for the fabrication of a pavement or roof covering.

2. The combination of a finishing-layer of pulverized granite or comminuted stone with the composition, made, as explained, of bitumen, coal-tar, gravel and wood sawdust.

HIRAM STAPLES.

Witnesses:
 R. H. EDDY,
 F. P. HALE, Jr.